(12) United States Patent
Haugan et al.

(10) Patent No.: US 11,299,051 B2
(45) Date of Patent: Apr. 12, 2022

(54) ELECTRIC CHARGING SYSTEM AND METHOD

(71) Applicant: SIEMENS ENERGY AS, Oslo (NO)

(72) Inventors: Espen Haugan, Trondheim (NO); Haakon Torgersen, Heimdal (NO)

(73) Assignee: SIEMENS ENERGY AS, Oslo (NO)

( * ) Notice: Subject to any disclaimer, the term of this patent is extended or adjusted under 35 U.S.C. 154(b) by 380 days.

(21) Appl. No.: 16/608,045

(22) PCT Filed: Apr. 23, 2018

(86) PCT No.: PCT/EP2018/060389
§ 371 (c)(1),
(2) Date: Oct. 24, 2019

(87) PCT Pub. No.: WO2018/202462
PCT Pub. Date: Nov. 8, 2018

(65) Prior Publication Data
US 2020/0189404 A1    Jun. 18, 2020

(30) Foreign Application Priority Data

May 5, 2017   (EP) ..................................... 17169651
Oct. 25, 2017  (GB) ..................................... 1717550

(51) Int. Cl.
*B60L 53/122*  (2019.01)
*B60L 50/40*   (2019.01)
*B60L 50/60*   (2019.01)
*H02J 50/10*   (2016.01)

(52) U.S. Cl.
CPC ............. *B60L 53/122* (2019.02); *B60L 50/40* (2019.02); *B60L 50/60* (2019.02); *H02J 50/10* (2016.02); *B60L 2200/10* (2013.01); *B60L 2200/32* (2013.01); *B60L 2210/30* (2013.01); *H02J 2207/50* (2020.01); *H02J 2310/42* (2020.01);
(Continued)

(58) Field of Classification Search
CPC ......... B60L 53/122; B60L 50/40; B60L 50/60
USPC ......................................................... 320/109
See application file for complete search history.

(56) References Cited

U.S. PATENT DOCUMENTS 6,118,676 A    9/2000  Divan et al.
6,331,765 B1  12/2001  Yamamoto et al.
(Continued)

FOREIGN PATENT DOCUMENTS

CN   1444741 A   *  9/2003  .............. G05F 1/32
CN   204376511 U     6/2015
CN   107359644 A    11/2017
(Continued)

*Primary Examiner* — Richard Isla
*Assistant Examiner* — Dung V Bui

(57) ABSTRACT

An electric charging system for a vessel, vehicle, or aircraft includes one or more energy storage modules on the vessel, vehicle, or aircraft; a pulse rectifier; a converter; and a voltage control transformer. The one or more energy storage modules are connected to outputs of the pulse rectifier. The voltage control transformer is connected to inputs of the pulse rectifier. The voltage control transformer includes a serial transformer having a plurality of pairs of transformer windings, connected together in series, one winding of each pair being adapted to be connected between the pulse rectifier and an input from an energy source and the other winding is connected to the converter.

20 Claims, 15 Drawing Sheets

(52) U.S. Cl.
CPC ....... *H02J 2310/44* (2020.01); *H02J 2310/48* (2020.01)

(56) References Cited

U.S. PATENT DOCUMENTS

| | | |
|---|---|---|
| 9,054,555 B1 | 6/2015 | Ward |
| 2019/0305688 A1* | 10/2019 | Seymour ............... H02M 7/219 |

FOREIGN PATENT DOCUMENTS

| | | | | |
|---|---|---|---|---|
| EP | 2072393 A1 | 6/2009 | | |
| KR | 20030007703 A | * | 1/2003 | ............ H01F 29/14 |
| KR | 101102313 B1 | 1/2012 | | |
| SU | 983896 A1 | 12/1982 | | |

* cited by examiner

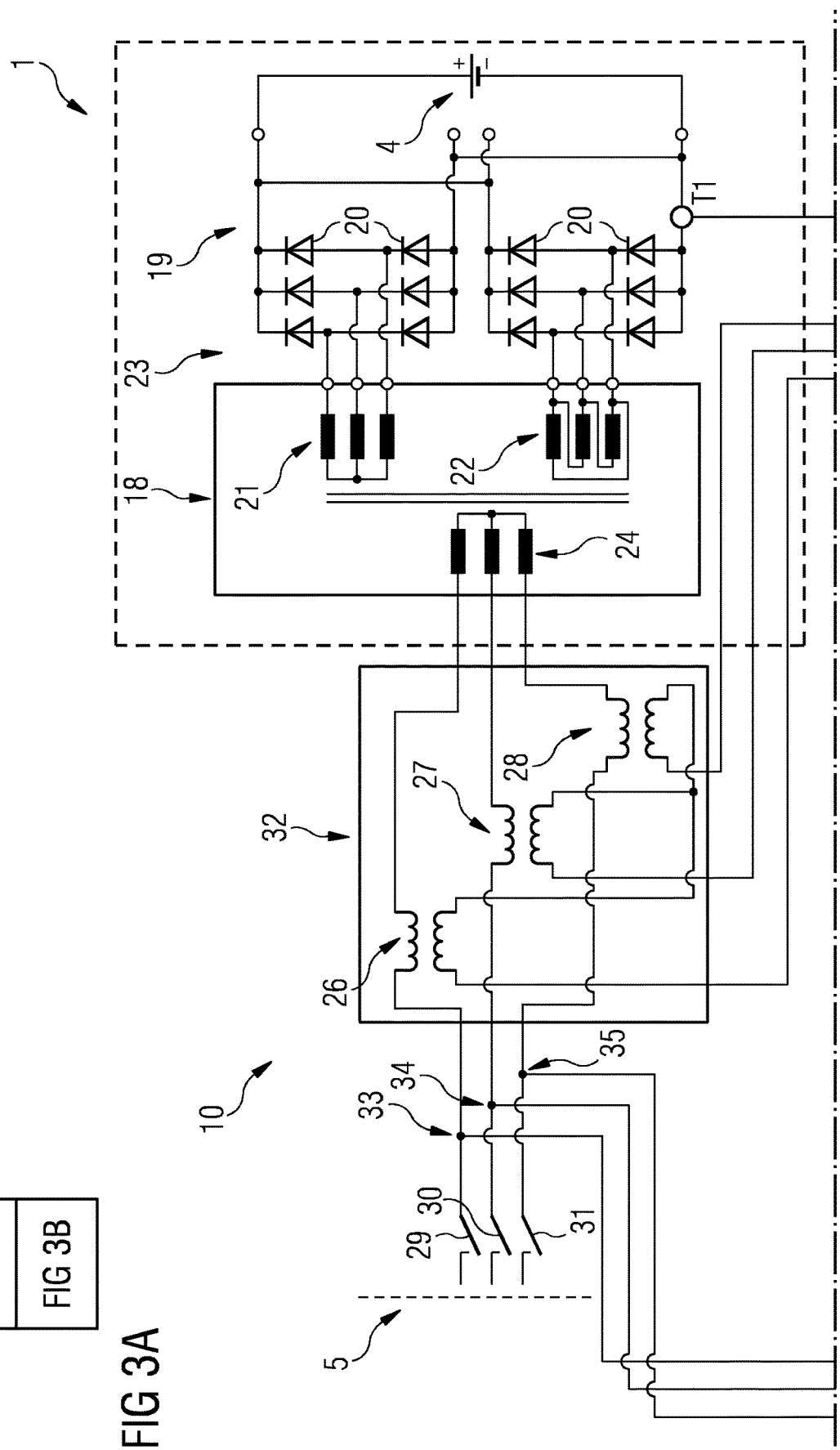

| FIG 4A |
| FIG 4B |

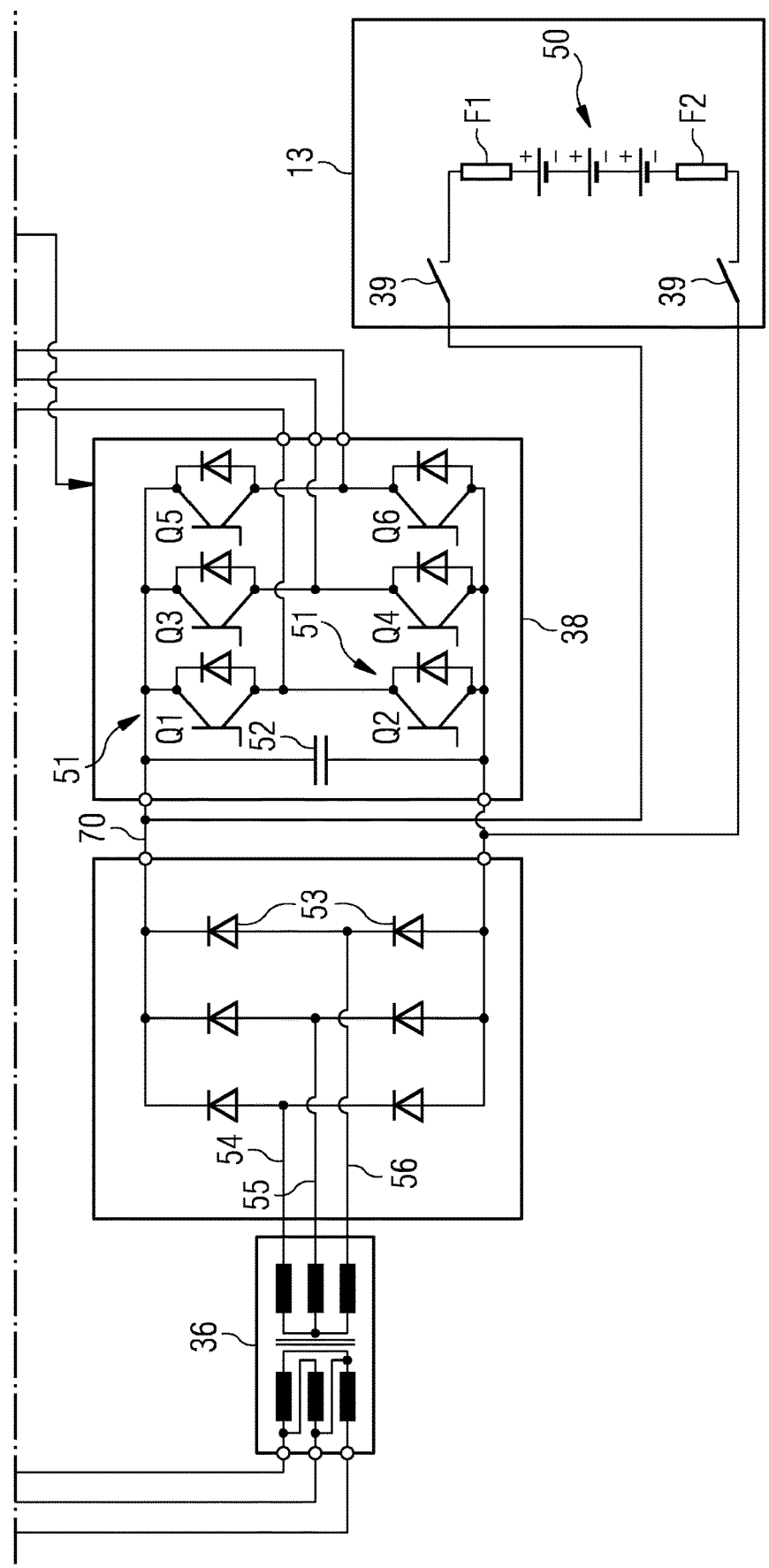

| FIG 5A |
| FIG 5B |

| FIG 11A |
| FIG 11B |

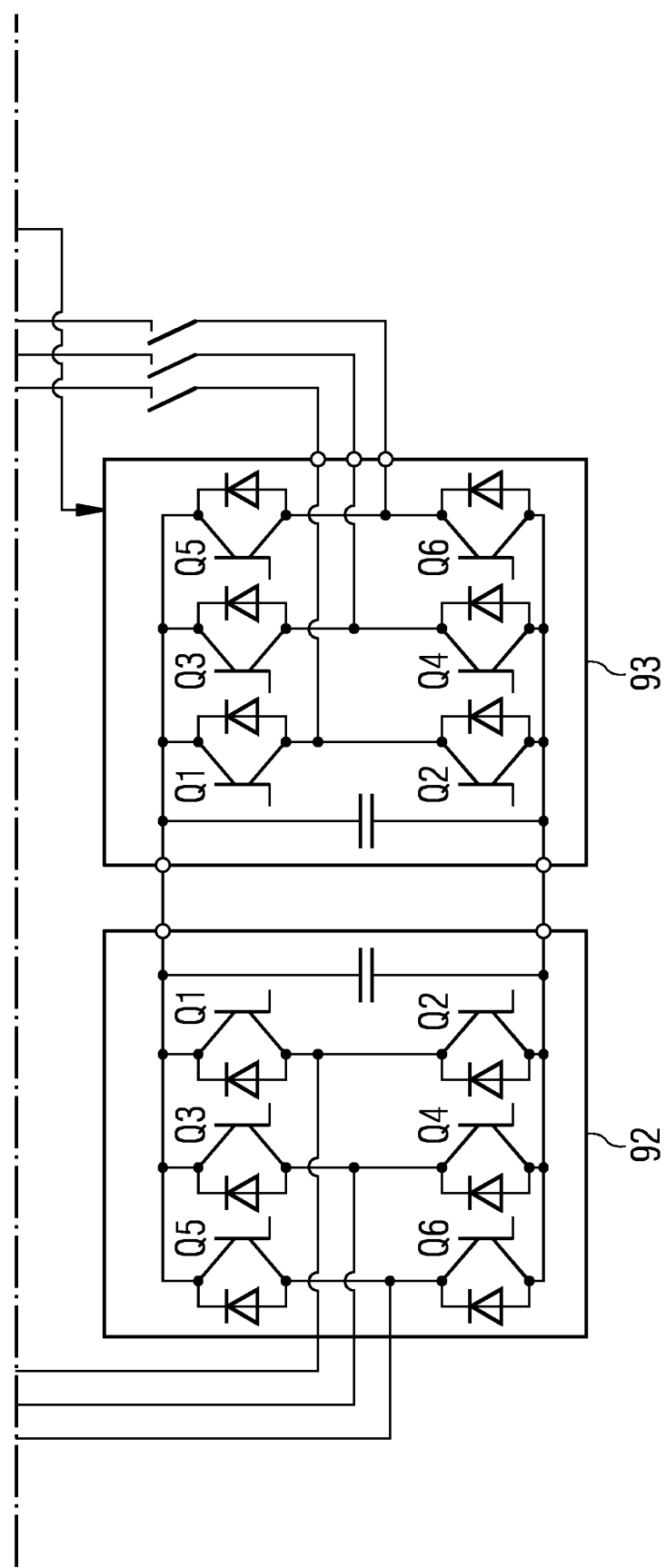

ELECTRIC CHARGING SYSTEM AND METHOD

CROSS REFERENCE TO RELATED APPLICATIONS

This application is the US National Stage of International Application No. PCT/EP2018/060389 filed 23 Apr. 2018, and claims the benefit thereof. The International Application claims the benefit of European Application No. EP17169651 filed 5 May 2017 and the benefit of United Kingdom Application No. GB1717550.6 filed 25 Oct. 2017. All of the applications are incorporated by reference herein in their entirety.

FIELD OF INVENTION

This invention relates to an electric charging system and method, in particular for a vessel, such as an electric ferry, or for a vehicle, or aircraft.

BACKGROUND OF INVENTION

Electric ferries may operate solely with batteries on board to power the vessel, or with a hybrid of diesel generators and batteries. In either case, the batteries require charging from a shore supply when docked. In some locations the shore power grid is not robust enough to support the high current requirement to charge the batteries on the vessel directly, so an intermediate shore based energy storage system is provided, which can charge more slowly from the local shore power grid and be able to provide high current charging to the vessel, whilst the vessel is docked. Even the charging of the shore based energy storage system may cause problems with the local grid, which need to be addressed.

SUMMARY OF INVENTION

In accordance with a first aspect of the present invention, an electric charging system for a vessel, vehicle, or aircraft, the system comprising one or more energy storage modules on the vessel, vehicle, or aircraft; a pulse rectifier; a converter; and a voltage control transformer; wherein the one or more energy storage modules are connected to outputs of the pulse rectifier; wherein the voltage control transformer is connected to inputs of the pulse rectifier; wherein the voltage control transformer comprises serial transformer having a plurality of pairs of transformer windings, connected together in series, one winding of each pair being adapted to be connected between the pulse rectifier and an input from an energy source; and wherein the other winding is connected to a converter.

The converter may comprise a controlled AC to DC converter.

The converter may further comprise a chopper between the output of the AC to DC converter and a DC bus.

The energy storage modules may comprise one of a battery or capacitor bank.

In accordance with a second aspect of the present invention an electric charging system for a vessel, vehicle, or aircraft comprises one or more energy storage modules on the vessel, vehicle, or aircraft; a transformer comprising primary and secondary inductances and a pulse rectifier; wherein the one or more energy storage modules are connected to the secondary inductances; a voltage control transformer connected to the primary inductances; and a converter; wherein the voltage control transformer comprises a serial transformer comprising a plurality of pairs of transformer windings, connected together in series, one winding of each pair being adapted to be connected between one of the primary inductances and an input from an energy source; the other winding being connected to the converter.

The system directly regulates the AC voltage to avoid reactive power generation, thereby enabling the energy storage system to be charged in readiness for arrival of the next electrically powered device for recharging.

The energy source input may comprise phases of a multiphase power supply.

The voltage control transformer may comprise the same number of pairs of transformer windings as there are phases of the multiphase power supply.

The energy source input may comprise connections to a three phase AC supply.

The converter may comprise a DC to AC converter.

The converter may further comprise an AC to DC converter, or a diode rectifier in series with the DC to AC converter.

The system may further comprise taps from the energy source inputs to the AC to DC converter.

A transformer may be connected between the AC to DC converter and the taps to the energy source input.

The system may further comprise a current detector to detect current flowing to or from the energy storage modules on the vessel, vehicle or aircraft.

The system may further comprise at least one of current or voltage detectors to provide an indication of current or voltage at the connection to the energy source.

The power supply, in particular, the multiphase power supply, may comprise a vessel power supply and the remote charging station may comprise a shore based charging station. Alternatively, the charging station is integrated on the vessel and connected directly to the AC grid as energy source.

One or more energy storage modules may be connected to the converter,

The charging station may further comprise a connector removeably connectable to a vessel, vehicle, or aircraft for electrically connecting the charging station energy storage modules to energy storage modules onboard the vessel, vehicle or aircraft to charge the onboard storage module.

An onboard grid controller, which may comprise an onboard grid converter and a pre-magnetising transformer, on the vessel, vehicle or aircraft provides a voltage source to prevent inrush current on connecting the onboard energy storage module to the energy source.

In accordance with a third aspect of the present invention, a vessel, vehicle, or aircraft, comprises a system according to the second aspect; and at least one consumer on board the vessel, vehicle, or aircraft, connected to the energy storage modules.

In accordance with a fourth aspect of the present invention, a method of charging an electric energy storage system comprises initiating a connection to an AC supply to charge an energy storage system of a vessel, vehicle or aircraft by closing a connection from the AC supply and regulating power from the AC supply to a rectifier transformer by means of a DC to AC converter and a voltage control transformer comprising a plurality of serially connected transformers.

The voltage control transformer is connected between the rectifier transformer and the AC supply. The connection from the AC supply may be in a charging station.

The charging station may comprise the DC to AC converter and the voltage control transformer and an AC to DC converter, or diode rectifier.

The method may further comprise synchronising the voltages at the output of the voltage control transformer and the input to the rectifier transformer before closing a breaker to connect one to the other. The method may further comprise connecting a voltage source to a secondary side of the rectifier transformer until the breaker is closed to connect the voltage control transformer and the rectifier transformer. The method may further comprise ramping the DC to AC converter voltage to increase voltage to the rectifier transformer.

BRIEF DESCRIPTION OF THE DRAWINGS

An example of an electric charging system in accordance with the present invention will now be described with reference to the accompanying drawings in which.

DETAILED DESCRIPTION OF INVENTION

There are a number of different end users of electrical energy which may need to recharge at the end of a journey, such as vessels, aircraft or vehicles. The examples given herein are for vessels, but the invention is not limited to these and is equally applicable to electrically powered aircraft or electrically powered vehicles.

Figure 1:
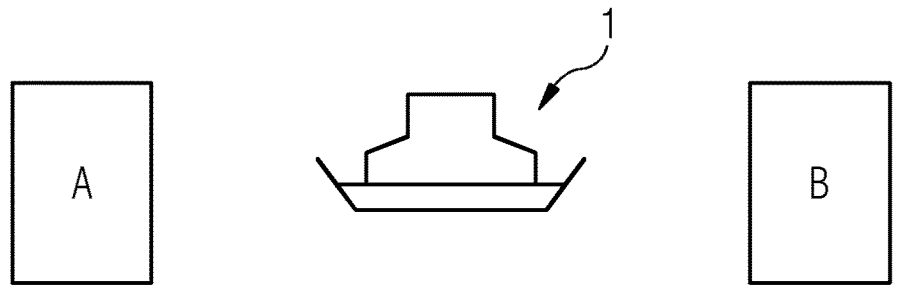
FIG. 1 illustrates an example of a use for an electric charging system according to the invention.

A typical situation for an electrically powered vessel with stored energy is shown in FIG. 1. A vessel, for example a ferry 1, running between ports with charging stations A, B at each port, charges up at a charging station A, before setting off on its journey. At station B the vessel recharges, then returns to its starting point and recharges again at station A. In the case of a vessel on a multi-stage journey, there may be several more ports, each with its own charging station, that are visited before returning to its home port. When docked at each port, the ferry connects to a supply, typically a shore based AC supply to charge the batteries ready for the next journey. In remote locations, this shore based AC supply may not be sufficient to allow the direct connection and high current charging required to charge in a relatively short timescale before the ferry must depart again, so a remote energy storage system may be provided. In the examples given, the remote energy storage system is a shore based energy storage system, which charges from the AC power grid more slowly, then has stored energy available to provide to the vessel when the vessel is connected to the remote charging station. Alternatively, the remote energy storage system may be on an offshore platform, for example part of a wind farm, or tidal energy generation system, or using waste gas or heat from a production process.

For the shore based charging system, the time available for charging the vessel may be limited by the time taken to unload and load the vessel before it sets off again, which may be as little as a few minutes for local ferries crossing short stretches of water, although longer for larger, long distance vessels. Although electric, or hybrid vessels, are still relatively rare, the number is expected to increase and in future, the shore based charging systems may have to be shared between multiple vessels, increasing demand. This increases the loading on the local grid making it even more important not to disrupt the local grid unduly during charging. Addressing the demand from the vessel for charging by improving the grid would involve significant cost to the grid operator, so it is desirable to address the problem another way. Existing shore based charging systems and energy storage may still cause problems to the local grid during charging because these systems typically use a controlled bridge commutating rectifier, such as a six-pulse thyristor rectifier, or other multiples thereof, transforming 100% of the energy through the converter, which results in the production of reactive power, due to the phase shift applied by the rectifier.

Figure 6A:
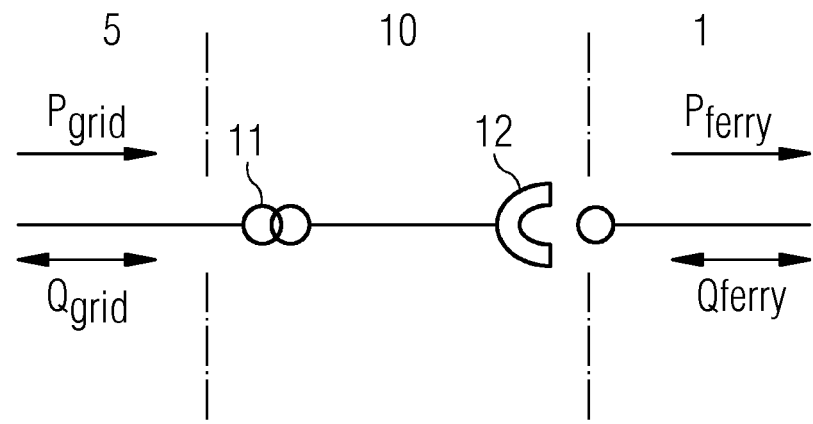
FIGS. 6a, 6b and 6c outline the power and reactance flows for each of a conventional charging system and two examples of the present invention.
Figure 6B:
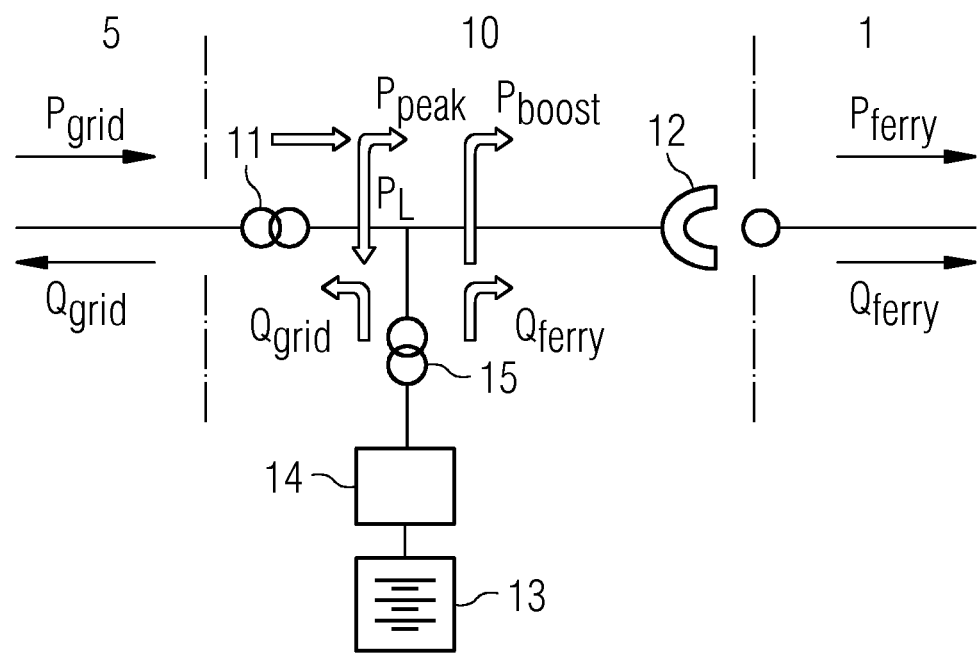

The basic principle is illustrated in FIG. 6a. Power $P_{grid}$ from the grid 5 is transformed by a transformer 11 at a charging station 10 to which the vessel 1 connects via connector 12, so that power $P_{ferry}$ is available to the vessel. Reactive power $Q_{grid}$ and reactive power $Q_{ferry}$ is produced when charging, cycling at the grid frequency, typically 50 Hz. In a more complex example, illustrated in FIG. 6b, where a shore based charging system 10 including energy storage is provided, the power $P_{grid}$ from the grid is transformed at the transformer 11 of the charging station and when there is a ferry connected at connector 12 for recharging, that power $P_{peak}$ is passed on to the ferry direct. In addition, power $P_{boost}$ may # be supplied to the ferry, as this example includes an energy storage system. The load power, $P_L$ is fed to the energy storage system when there is no direct connection to charge the vessel. This received power $P_L$ passes through another transformer 15 and a converter 14 acting as an inverter for this purpose and is stored in the energy storage system, illustrated here as a battery 13. Other types of energy storage, such as a capacitor bank, flywheel storage, or chemical storage may be used. Thus, peak power $P_{peak}$ from the grid, together with boost power $P_{boost}$ from the energy storage system may be provided from the charging station 10 to the ferry 1, with the assistance of the shore based energy storage system 13, 14, 15. Reactive power generated in the shore grid $Q_{grid}$ and reactive power produced in the vessel grid $Q_{ferry}$ are compensated by reactive power being returned to those grids from the energy storage system of the charging station 10.

Figure 6C:
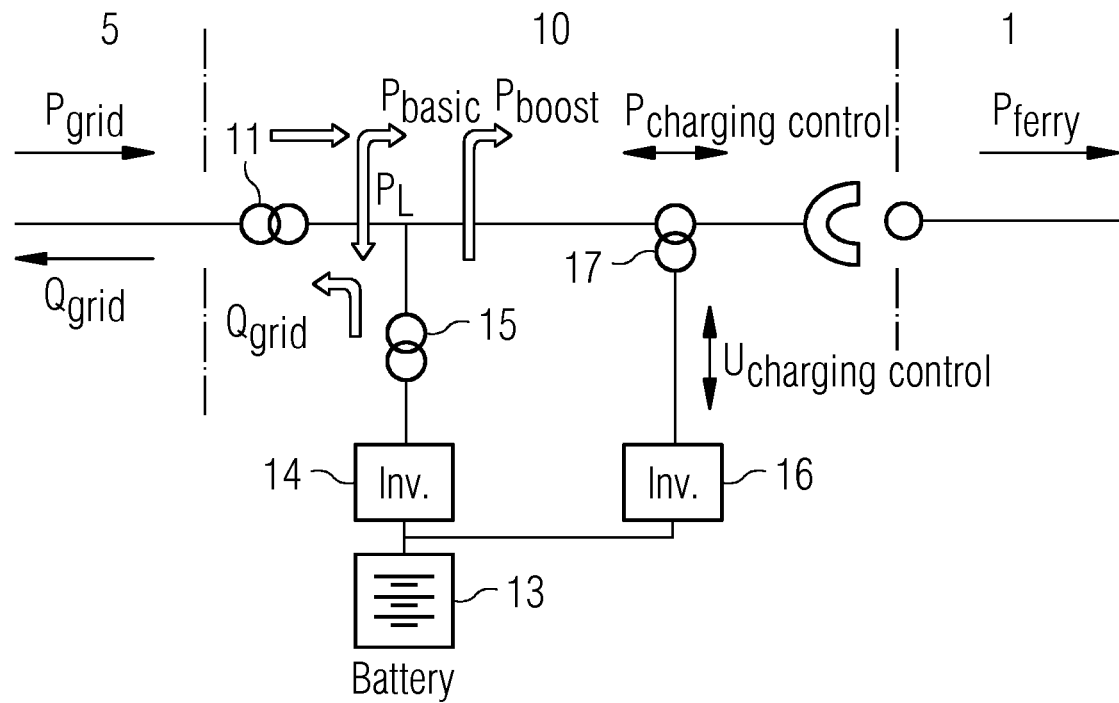

FIG. 6c shows how providing charging control in the charging station 10 avoids reactive power on the vessel grid 1. As in FIG. 6b, the power $P_{grid}$ from the grid is transformed at the transformer 11 of the charging station and when there is a ferry connected for recharging, that power $P_{peak}$ is passed on to the ferry directly through connector 12. In addition, power $P_{boost}$ may be supplied to the ferry from the energy storage system 13. The load power, $P_L$ charges the energy storage system when there is no direct connection to charge a vessel. The power $P_L$ passes through the converter 14, operating as an inverter in this case, to the battery 13 and may also be stored via another transformer 17 in the charging station 10 and inverter 16 and be stored in the battery 13. Thus, peak power $P_{peak}$ from the grid, together with boost power $P_{boost}$ from the energy storage system may be provided from the charging station 10 to the ferry 1, with the assistance of the shore based energy storage system 13. However, in this case, although reactive power generated in the shore grid $Q_{grid}$ is compensated by reactive power being returned to the shore grid from the energy storage system 13 of the charging station 10, there is no reactive power generated in the vessel, so no need to return reactive power. Instead, there is a second converter 16, operating as an inverter or rectifier accordingly and transformer 17 across which charging control power is produced. Voltage, U, may be regulated in front of the charging plug 12 resulting in a regulated voltage in front of the rectifier transformer 23 thereby controlling the rectifier current, preferably as a positive voltage to avoid forming a loop, although control is still possible with a negative voltage.

Figure 2:
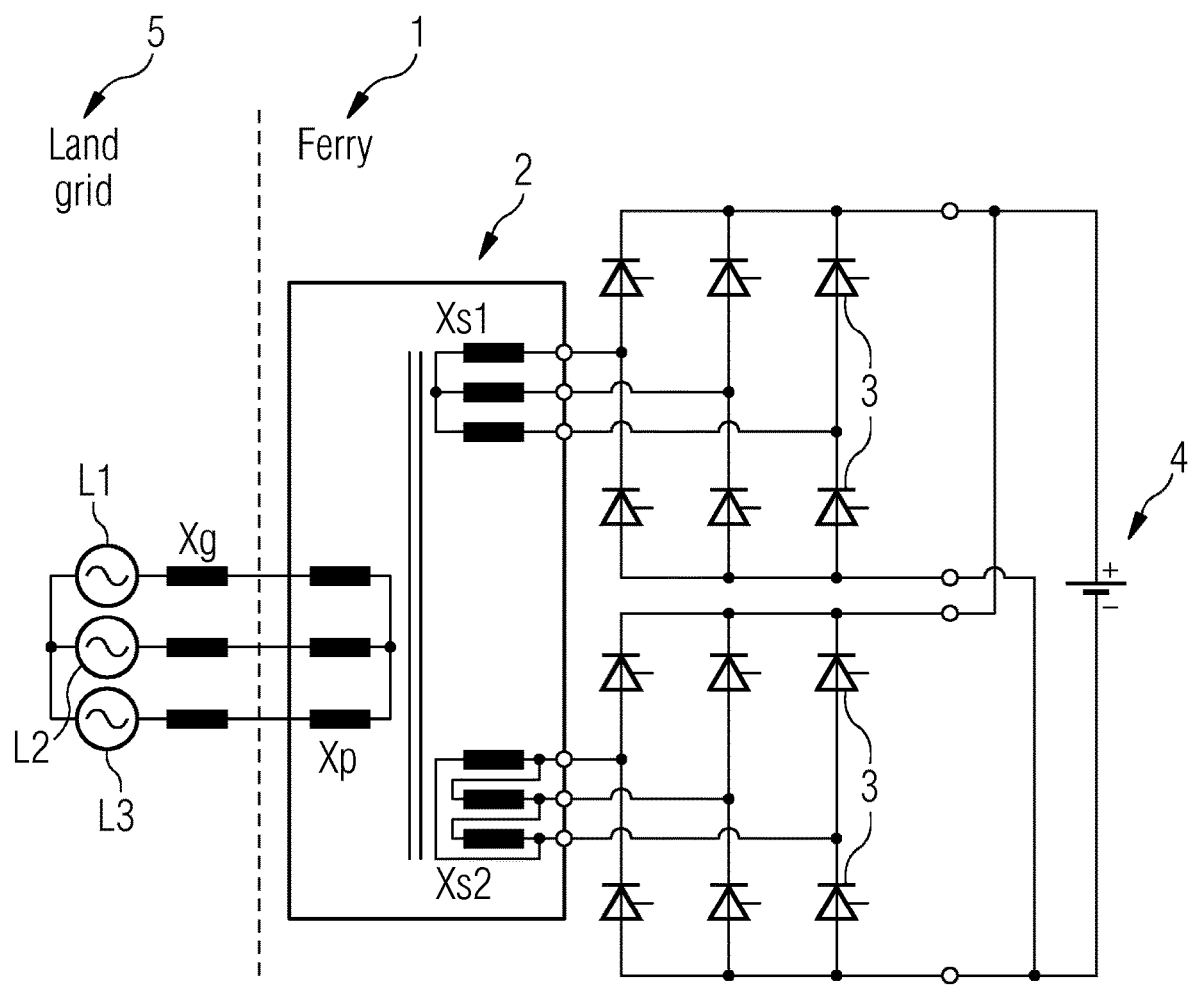
FIG. 2 illustrates a conventional charging system for a vessel.

Charging of the energy storage 4 on the vessel 1 from the local grid 5, or shore based energy storage 13 has typically been done using a controlled grid commutated rectifier such as a thyristor 6, 12, 18 or 24 pulse rectifier. An example of a conventional thyristor rectifier charger for the onboard energy storage is illustrated in FIG. 2. A rectifier transformer 2 with, in this example, thyristors 3 being connected to form a 12 pulse thyristor rectifier, is provided on the vessel 1. The transformer 2 is connected between onboard energy storage 4, for example batteries and the shore grid 5. 3-phase AC voltage, L1, L2, L3, is supplied through grid impedance Xg from the shore grid 5 to a primary reactance source 6 at the input to the ferry transformer 2. Voltage is then supplied through secondary reactance Xs1 and Xs2 to different legs of the bridge. A star delta arrangement is used, with Xs1 in a star topology and Xs2 in a delta topology. Use of thyristor rectifiers and inductance allows a delay to be applied to conduction, reducing the average DC voltage. However, this delay is achieved by means of a phase shift of 30° which is introduced to the source voltage, having an effect equivalent to reactive power in the shore grid, drawing current and cycling at the supply frequency, causing losses and voltage drops in the shore grid. Thus, the conventional solution still causes some inconvenience to other users and problems for the grid operator.

When the local AC power grid 5, is unable to provide the necessary high current supply to the vessel 1 for rapid charging, the charging system 10 comprises a plurality of energy storage modules 13, which are charged more slowly from the AC power grid than a direct connection to the vessel would require. The maximum current that is drawn from the AC power grid may then be chosen to be relatively low. When the vessel 1 is plugged in to the charging station 10, high current charging is possible, so the batteries 4 on the vessel may be charged relatively quickly compared to what would be possible with that AC power grid 5 alone. The vessels supplied in this way may have electric motors having an output from a few hundred kilowatts upwards. There may also be circumstances where the demand from the vessel in terms of power and speed of charging, such as when docked overnight, would be low enough to connect directly to the local grid, but the issue of reactive power generation makes this impractical.

Figure 3B:
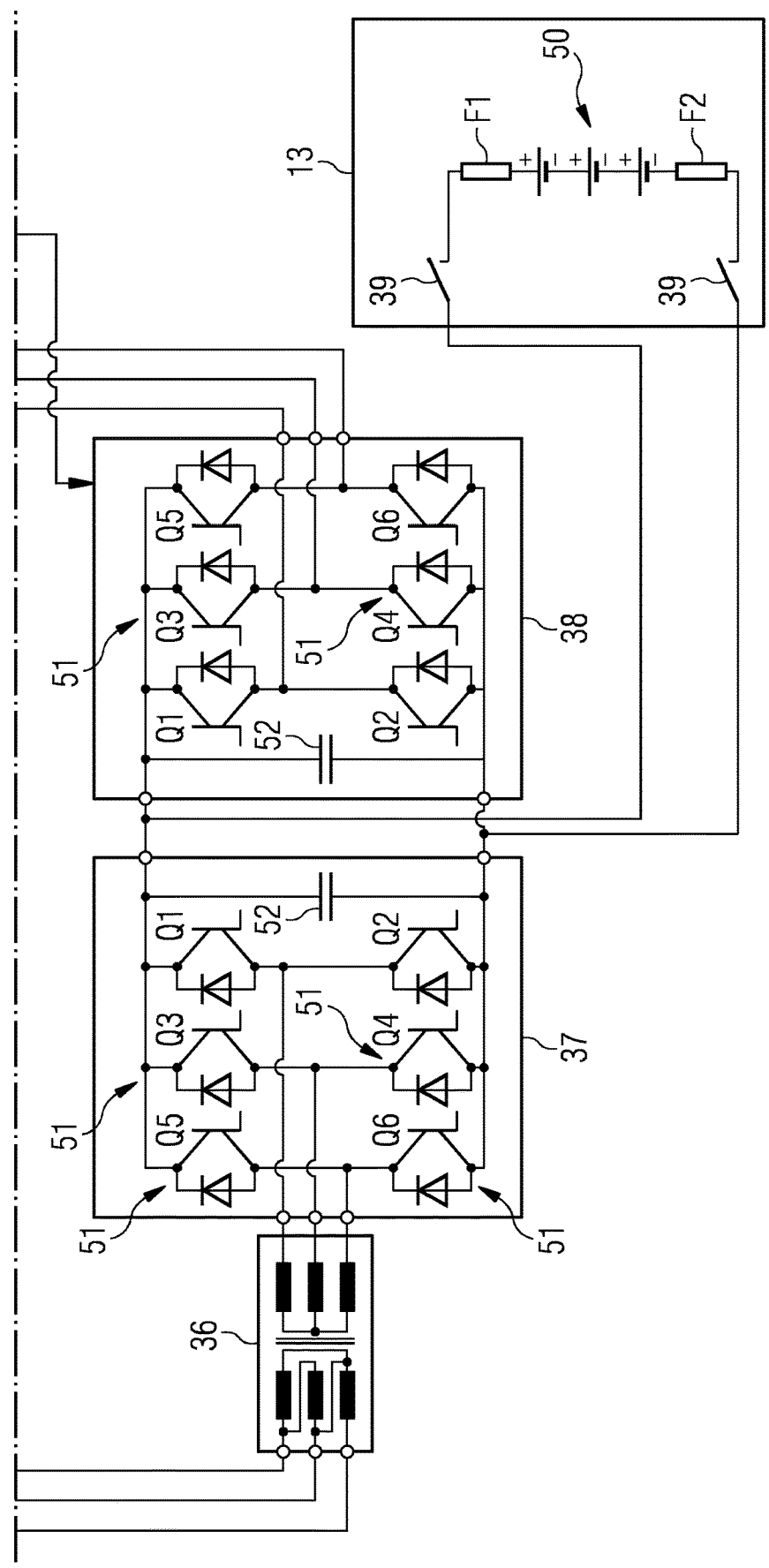
FIG. 3 illustrates a first example of an electric charging system according to the invention.
Figures 4, 4A:
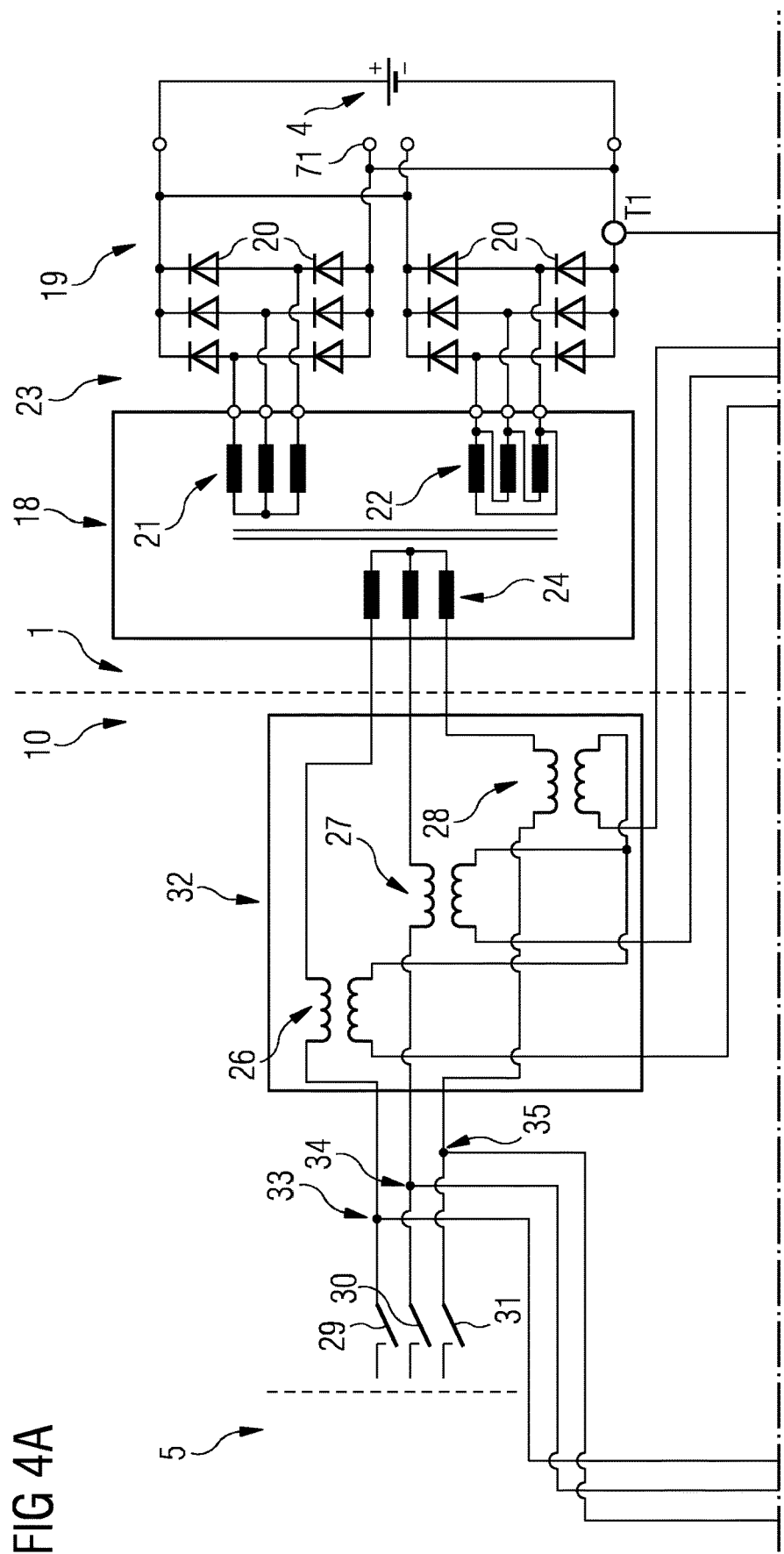
FIG. 4 illustrates a second example of an electric charging system according to the invention.
Figures 5, 5A:
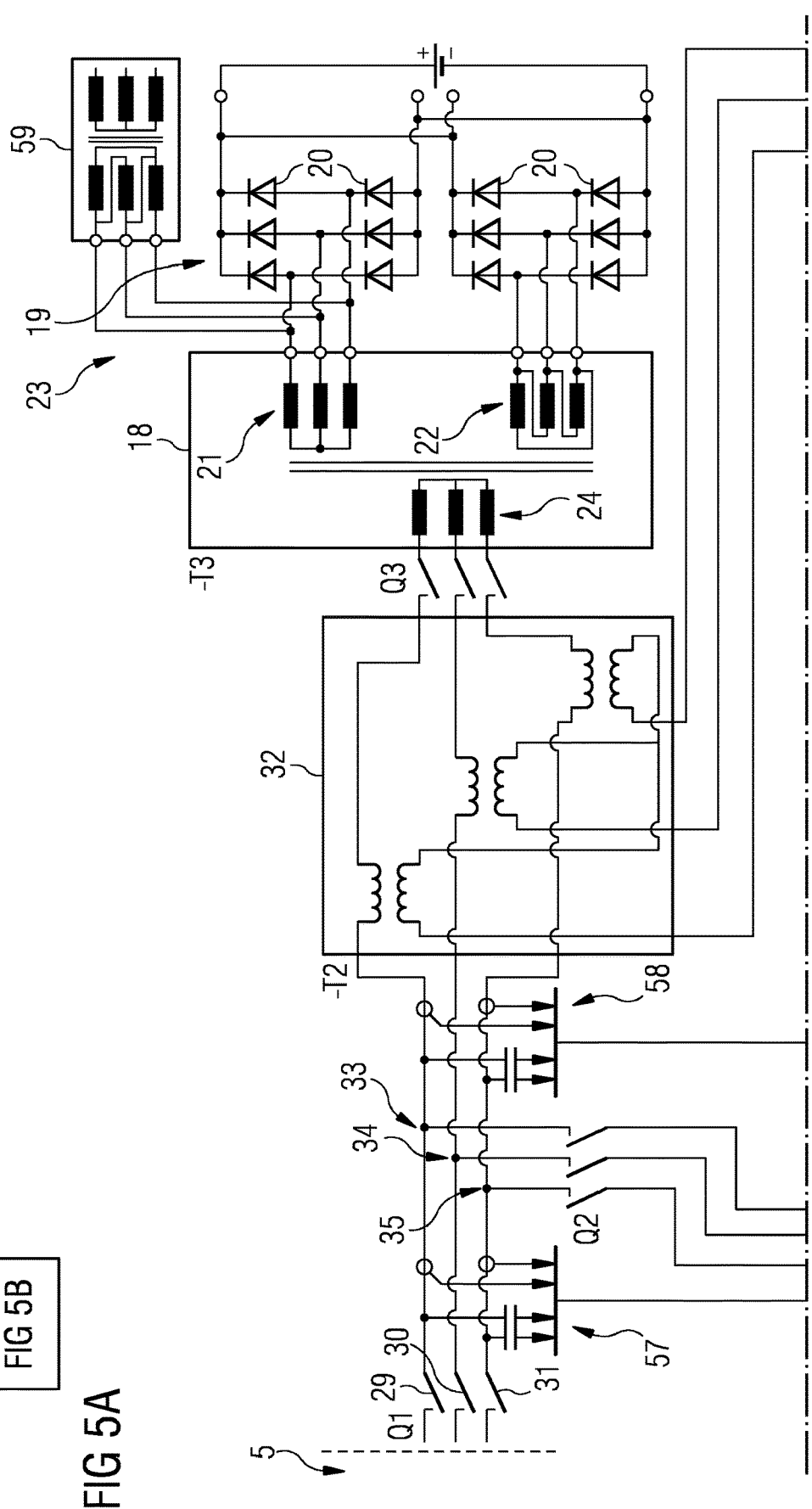
FIG. 5 illustrates a third example of an electric charging system according to the invention.
Figure 5B:
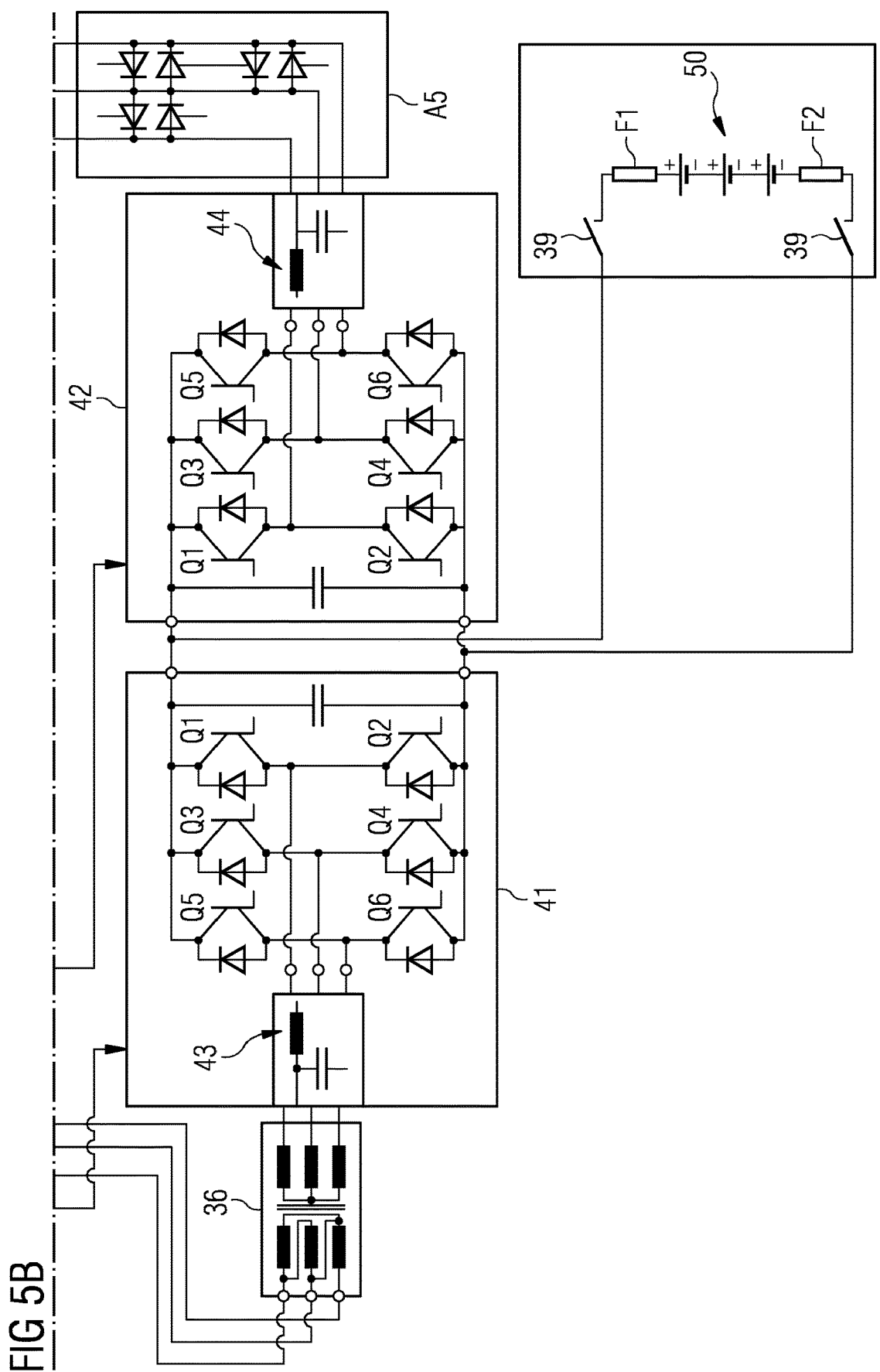

The present invention addresses this problem by providing a controlled AC to DC converter and a controlled DC to AC converter in the charging system 10 together with a serial transformer to the AC grid 5 so as to be able to adjust the voltage supplied to the vessel 1 and therefore be able to use a passive rectifier on the vessel, rather than the conventional thyristor controlled rectifier. This allows space to be saved on the vessel. However, there is also the option of providing all of the equipment connected to the AC main grid 5 on the vessel, rather than having a shore based charging system, so that the vessel can charge directly from the mains at any remote location, without the need for the shore based charging station to have been installed at that location. In that case, the optional energy storage system 13 may be excluded. The examples of FIGS. 3 and 4 show the equipment on the shore with a passive rectifier on the vessel and the example of FIG. 5 shows all the equipment on the vessel with a direct connection to an AC charger on shore. However, these examples are not limiting and embodiments with the arrangements of FIGS. 3 and 4 are possible with the components of the charging station 10 all located on the vessel, as are embodiments of the type illustrated in FIG. 5, but with the components of the charging station 10 being located mainly on the shore with just the passive rectifier and vessel battery, on the vessel, but otherwise with the same circuitry as illustrated in FIG. 5.

FIG. 3 illustrates a first example of the present invention, for the example in which the thyristors 3 of the rectifier transformer circuit are replaced by passive diodes 20 in a rectifier 19, connected to inductances 21, 22 in a transformer 18 to form a 12 pulse rectifier transformer 23. In practice, where a thyristor based system already exists, the thyristors can be operated as if they were diodes, rather than having to be replaced. For a new installation, the passive rectifier may be built using diodes, rather than thyristors. The bridge rectifier 23 on the ferry 1 has the same star delta topology as illustrated in FIG. 2. However, instead of a direct connection to the AC mains supply 5, inductances 24 on the input side of the transformer are each coupled through one of a pair of serial connected transformer windings 26, 27, 28 to respective AC grid connections 29, 30, 31 in the voltage control transformer 32. A tap 33, 34, 35 off each line to the AC grid connections is connected to a transformer 36 at the input to a controlled AC/DC converter 37, with delta star topology. The other one of the pair of transformer windings 26, 27, 28 in each case is connected to a controlled DC/AC converter 38. A current sensor, T1 for the rectifier current to the battery is provided. The rectifier current may be measured directly or indirectly from the AC current, although generally an indirect measurement is simpler, rather than needing to produce a signal that has to go across the ship to shore connection.

The converters 37, 38 operate as inverters or rectifiers according to whether they are converting from DC to AC or vice versa. If required, an optional DC energy storage unit 13 is provided, connected across between the AC/DC converter 37 and the DC/AC converter 38. At each end of a string of energy storage devices 50, a fuse F1, F2 may be provided for electrical isolation in the case of a fault and switches 39 for galvanic isolation. The AC/DC converter 37 and DC/AC converter 38 may take any suitable form, for example, a basic unit 51 of a diode in parallel with a transistor (Q1 to Q6), a pair of such units being connected in series and each transformer winding 26, 27, 28 being connected between a pair of units 51. A filter capacitor 52 may be provided in parallel with the pairs of units 52. In combination with the converter inductance this capacitor forms a sine wave of the voltage from the pulse with modulated voltage from the converter.

The circuit of FIG. 4 is the same as FIG. 3, except that the AC/DC converter 37 of FIG. 3 is replaced by a diode or a thyristor rectifier 41. Use of a rectifier means that the power can only flow in one direction and hence that the voltage on the transformer 32 can only be regulated in the positive direction. This topology is most suitable where the optional energy storage batteries in the charging station is not present. The diode rectifier 40 may comprise a pair of diodes 53 for each of the AC voltage inputs, connected through transformer 36, each input 54, 55, 56 from the transformer 36 being connected between a pair of diodes 53. The circuit is otherwise the same and operates in the same way as the FIG. 3 embodiment. An alternative to this topology is to supply the DC link 70 for the DC/AC converter 38 from the battery DC link 71 and put all the equipment in sections 10 and 1 onboard the ship.

The circuit of FIG. 5 shows an example using a controlled AC/DC converter 41, to which the inputs from transformer 36 are connected through a common LC filter comprising a capacitor and inductance 43 and a controlled DC/AC converter 42 to which the inputs from the serial connected voltage controlled transformer 32 are connected via a crowbar A5, then through a common LC filter comprising a capacitor and inductance 44, so that if a short circuit occurs on the Q3 side of T2, the crowbar stops the flow of current until Q1 has disconnected the AC supply from the system. The crowbar avoids currents causing damage to the freewheeling diodes in converter 41. The voltage controlled transformer 32 impedance limits the current in case of a short circuit. The same current on the primary side of the transformer will be reflected on the secondary side of the transformer 32 only with the ratio difference between the two sides of the transformer. When the crow bar detects a short circuit by current measurement, the crow bar shorts the secondary side of the transformer and the short circuit current flows in the crow bar instead of the converter 41 freewheeling diodes until the circuit breaker Q1 opens the short.

Additional protection may be provided by the taps 33, 34, 35 having breakers Q2 in the lines to the transformer 36 and also by the use of a contactor, which performs the function of a breaker, at Q3, between the voltage control transformer 32 with its direct series windings. Voltage and current sensors 57, 58 may be provided between the shore grid connection and the voltage controlled transformer 32 and the sensed data supplied to converters 41 and 42, which then control the power on each side of the transformer 32 and hence the supply of the grid power to the vessel battery 4, accordingly.

On the ferry itself, a grid controller (GC)—not shown—is connected through a pre-magnetisation transformer 59 to the legs of the diode bridge. Rather than using thyristors in the vessel transformer 2 to keep the voltage at an acceptable level for the grid 5, the voltage is adjusted on the Q3 side, in the charging station 10, which may be on shore, or incorporated in the vessel, as explained above. The AC voltage is directly regulated to avoid reactive power production. In practice, the energy storage 13, or battery connected between the converters, 41 and 42 is often needed to enable the vessel to be charged at the rate required. A shore battery pack may be charged with a much lower power, e.g. 2 MW continuously, with a charge capacity of 7 MW, which is then available to the vessel when it connects to recharge.

The modified charger design has the effect of keeping the rating required for the power electronics to a minimum. The topology enables only part of the controlled power to be transferred through the power electronics. The rest of the power is running in parallel to the power electronics, so the power electronics only need to be dimensioned for a small part of the total power. The voltage regulation of the serially connected transformer windings of the voltage control, or cascade, transformer 32 may be limited to system maximum voltage variations. By doing this only a part of the power to the rectifier is transferred to the cascade converter. For example, the voltage of the grid may have an amplitude that can vary from about 230V to as much as 24 kV, for example for a ferry, this may be in the range of 9.9 kV to 12.1 kV. The voltage range depends upon the size and application. For example, the ferry DC voltage varies according to the state of charge and the charging power of the onboard energy storage 4. These variations need to be regulated by the cascade converter 32 to be able to control the battery power.

Figure 7:
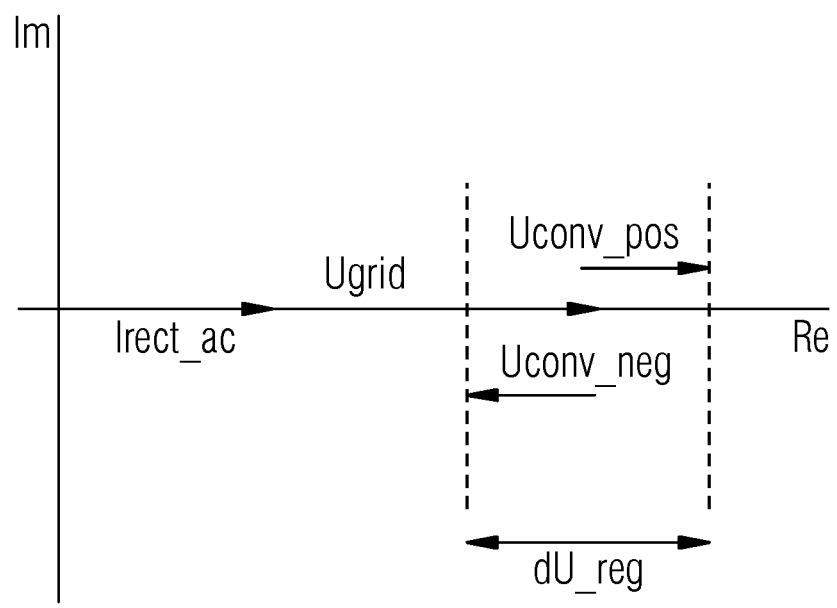
FIG. 7 illustrates regulated power flow with voltage vectors.

FIG. 7 illustrates regulation of the voltage of the ferry to be in phase with the grid voltage in both positive and negative directions, in terms of vectors. The conversion voltage in the positive direction, Uconv_pos and conversion voltage in the negative direction, Uconv_neg. The voltage regulation, dUreg, is then the sum of these vectors Uconv_pos and Uconv_neg. The grid voltage is represented by Ugrid vector. The ac current will normally be in phase with (Ugrid+Uconv) to ensure a power factor of 1.

Figure 8:
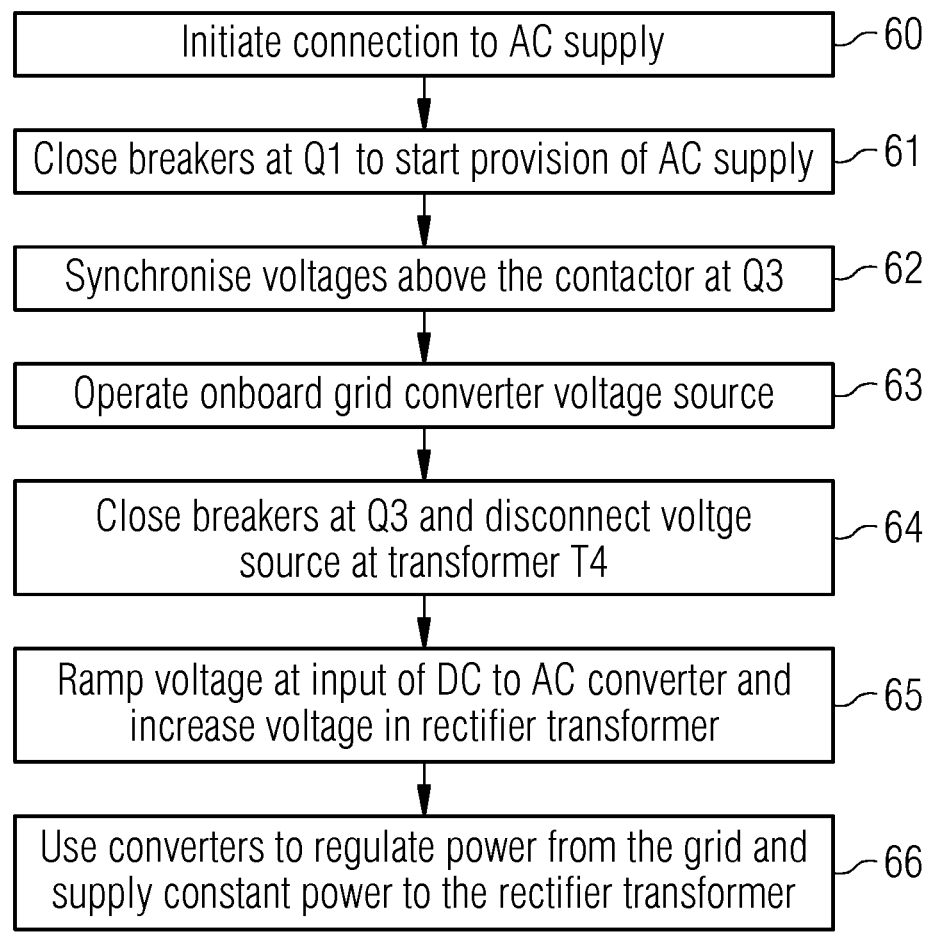
FIG. 8 is a flow diagram illustrating a method of controlling charging of a vessel electric power supply according to the present invention.

An example of a method of charging in a stored electrical energy power supply system is shown in the flow diagram of FIG. 8. The initial connection 60 of the vessel to the AC supply through the charging station, which may be located on the shore or located on the vessel, is made with breakers Q3 initially open. The AC supply is connected to the system by closing breakers at Q1. This allows the supply 61 of three phase AC. Before closing 61 the breakers at Q3, the inverter 42 synchronises 62 the voltages above the contactor at Q3, i.e. to the left and the right of the breaker between all phases. The grid converter onboard the ship is used 63 as a voltage source connected to the secondary side 21, 22 of the rectifier transformer 23 on the ferry through the small pre-magnetising transformer 59. The voltage source typically supplies voltage at between 6 kVA and 20 kVA depending on how long the source is to be connected. The pre-magnetising transformer 59, or sync transformer, is installed to avoid large inrush currents in the rectifier transformer 23 coming from the grid.

When Q3 is closed 64, the GC ferry sync transformer 59 is disconnected and then the converter 42 voltage ramps 65 from Uconv_pos resulting in increased voltage to the rectifier transformer. The voltage ratio on the rectifier transformer 23 should ensure that there is no, or very little, current flowing in the rectifier 23 until the cascade transformer 32 has zero voltage across it. When Uconv_pos is higher than zero, the current in the rectifier 23 can start to flow. The voltage level at which the current starts to flow is dependent on the grid voltage and the battery state of charge. The synchronization voltage should have a voltage less than the Ugrid voltage taking the ratio in the rectifier transformer 23 into consideration, so the cascade converter 32 has to work in the Uconv_neg region.

During operation, charging the vessel, the inverter(s) 41 regulate 66 the power from the grid to not climb above a maximum allowed level while the inverter 42 should control a constant power to the rectifier transformer. As previously mentioned, the rectifier onboard the ferry works as a diode rectifier even in the case where the rectifier is a thyristor rectifier. The thyristor may still be used as a protection device in case of failures, but the arrangement of the charging station means that there is no power regulation by the thyristor rectifiers to avoid reactive power consumption from the grid.

Although the circuit on the vessel 1 is superficially similar to that of the present invention, there are many benefits in exchanging the thyristors for diodes, or operating existing thyristors as diodes, including that the onboard current capacity is significantly increased and the rating requirements for the onboard transformer, particularly the power electronics, are reduced because that transformer does not need to cope with reactive power. The transformer may be reduced with a VA-rating of 20%, changing from thyristors to diodes increases the power rating for the same module by about 1.5 to 1.7 times. The modified design results in a physically smaller overall system, having fewer interfaces. In addition, in engineering terms, a change anywhere in the circuitry of a thyristor based system will give rise to rise to the need for corresponding change elsewhere in the system, which is not the case when passive semiconductor devices, typically diodes, are used. These also have the benefit of saving space and cost.

Figure 9:
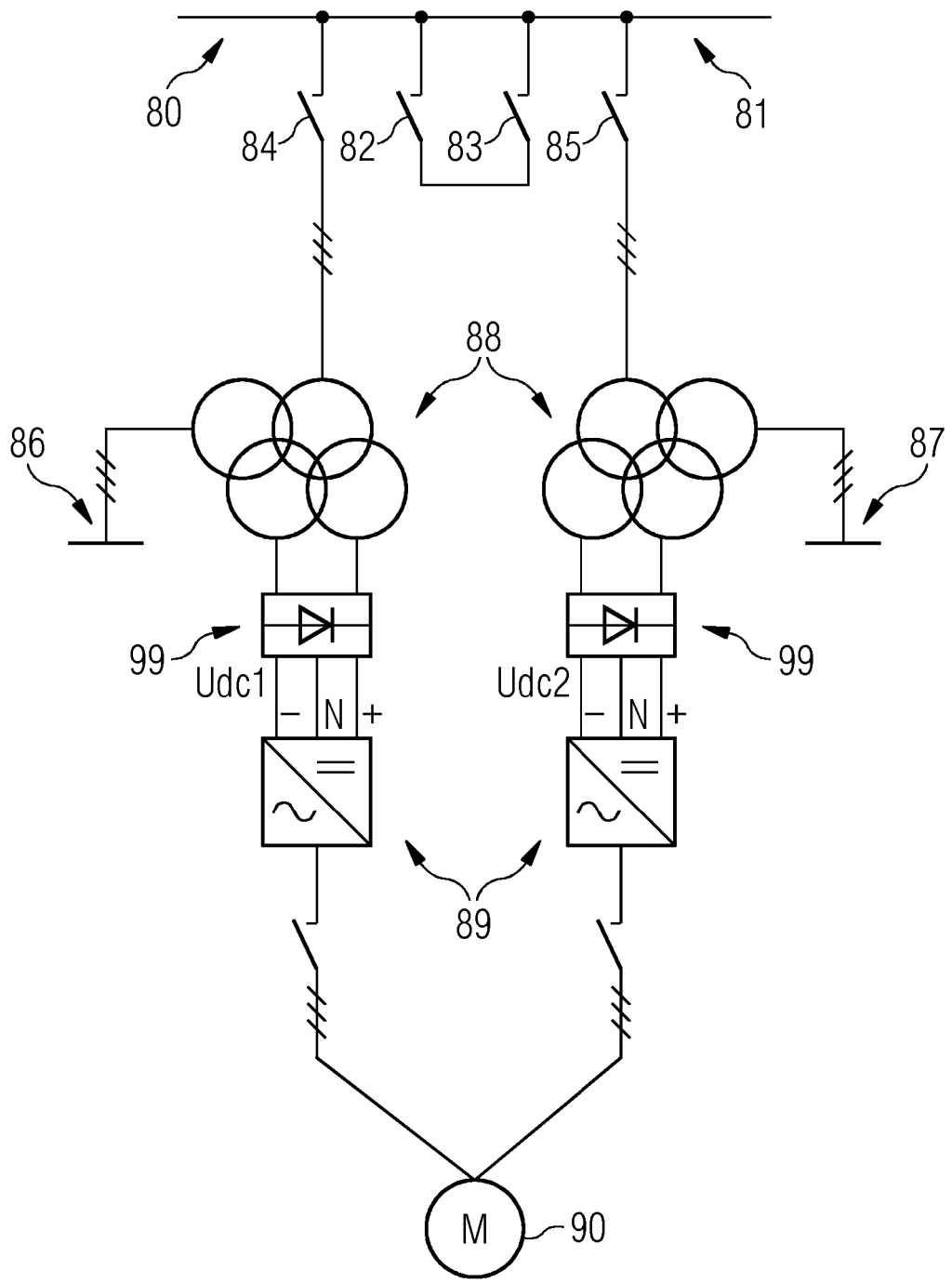
FIG. 9 illustrates a dual converter system in which the present invention may be applied.

FIG. 9 shows a single line diagram illustrating a 3-phase converter system for an electrical propulsion system. The system shown is a dual converter system feeding through parallel inputs to a single motor 90. A first bus 80 is connected to a second bus 81 by means of bus ties 82, 83. Switches 84, 85 connect the first 80 bus or second bus 81 to a transformer 88, the outputs of which are connected via rectifier 99 to a DC to AC converter 89, to supply AC voltage to the motor 90 from each line. The transformers 88 may each have a connection to an auxiliary bus 86, 87. In such a system, it is desirable that the motor 90 continues to operate, even when a bus tie 82, 83 on a primary side of a transformer 88 is open.

In order to be able to maintain the same DC voltage from each side, if a bus tie on the primary side of transformer 88 is open, the same topology as FIG. 9 is used, but with an additional circuit provided for one of the drives, between the first bus 80 or the second bus 81 and the voltage control transformer 32 in that line. This can be seen in FIG. 10. The additional circuit comprises a serial transformer 91 with a converter 92, 93 on the secondary side of the transformer 91 connected to the auxiliary bus 86. This ensures that the DC voltage from each side is still equal, even if a bus tie 82, 83 is open. Thus, when the DC voltage is regulated to the same DC voltage level, parallel drives may still be connected to the motor, even if a bus tie between the first and second buses 80, 81 is open.

Figure 10:
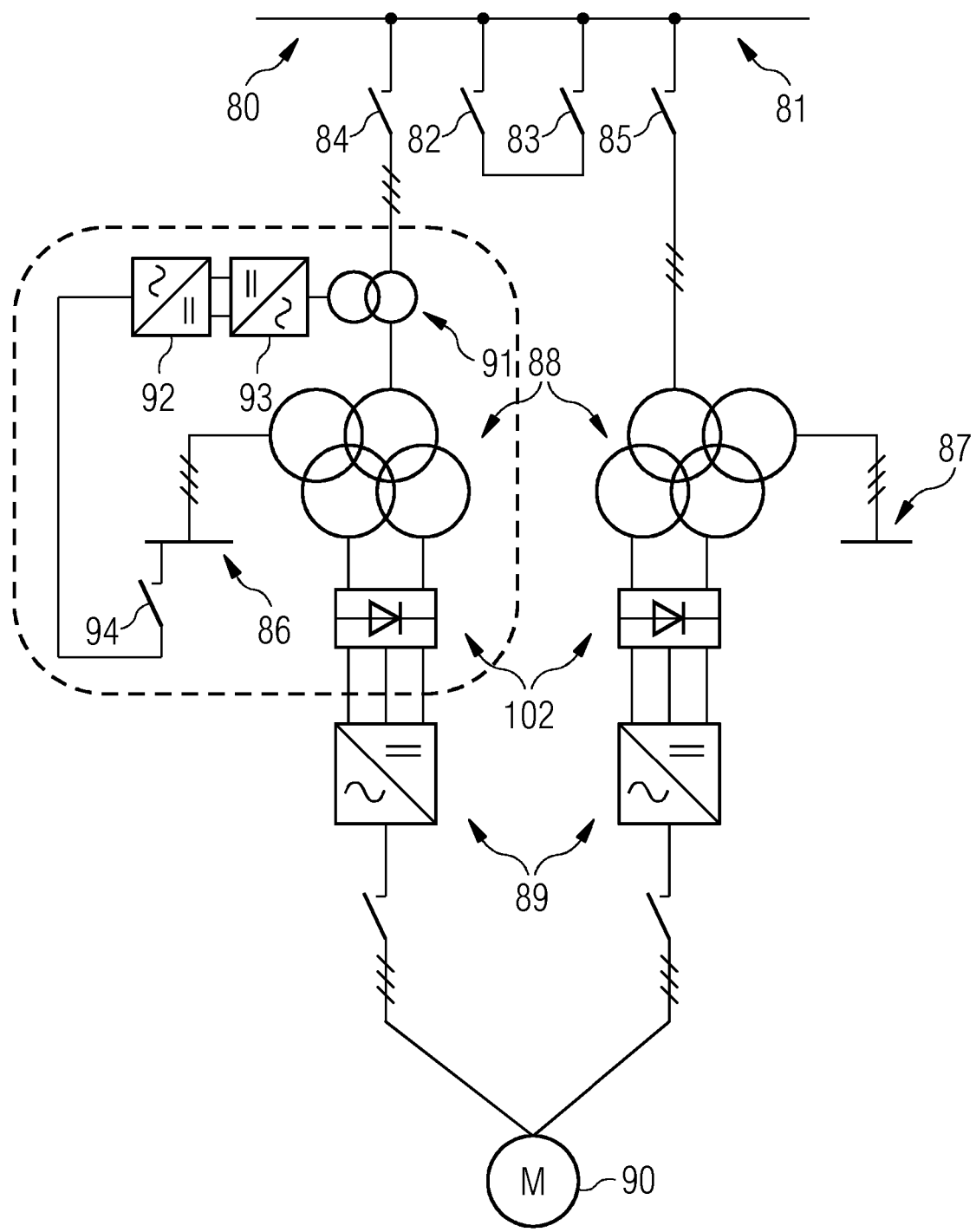
FIG. 10 illustrates a fourth example of an electric energy charging system according to the present invention for use with the system of FIG. 9.
Figures 11, 11A:
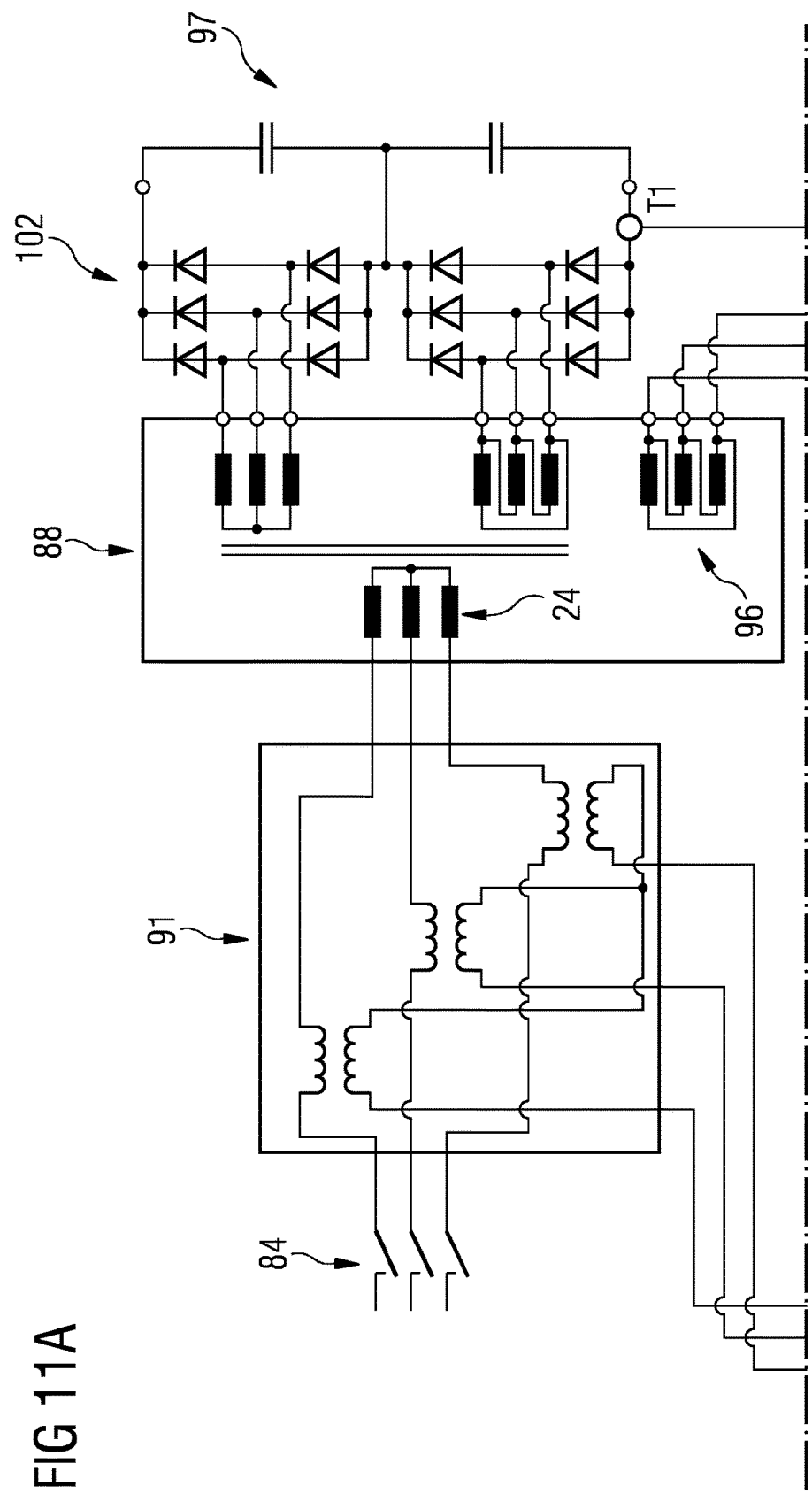
FIG. 11 (FIG. 11A-FIG. 11B) illustrates a fifth example of an electric charging system according to the invention; and, FIG. 12 illustrates an example of the present invention for use in low voltage systems.

FIG. 11 (FIG. 11A-FIG. 11B) illustrates a section of FIG. 10 within the dotted line 95. Switches 84 between the three phase supply and the first bus 80 are normally closed. The windings of transformer 91 are input to a controlled AC to DC converter 92 and controlled DC to AC converter 93, the output of which may be connected to pulse rectifier transformer circuitry 88, 99 through an additional secondary winding 96. In the example shown, a typical bus voltage is 11 kV, with a 690V auxiliary bus, but the invention is not limited to these voltages. The energy storage 97 may be in the form of a battery, or capacitor bank 97.

Figure 12:
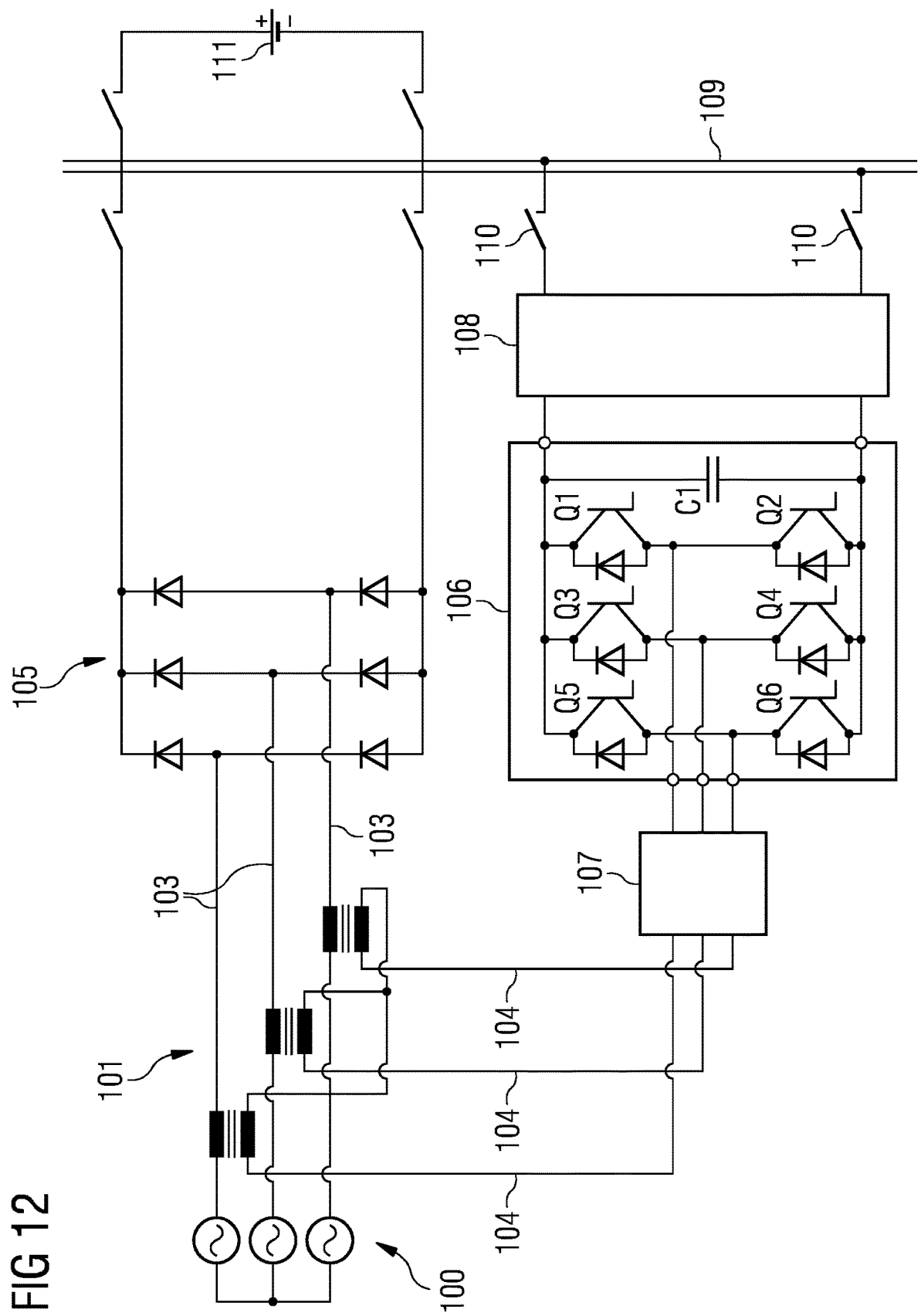

A further modification is proposed for low voltage applications, as illustrated in FIG. 12. Here, only a single transformer 101 is required to provide voltage control, but the transformer of the rectifier transformer used for medium voltage applications may be omitted. One winding 103 of each pair of the voltage control transformer windings is connected directly to the pulse rectifier 105, the output of which is connected to the energy storage module 111 and the other winding 104 is connected to a controlled AC to DC converter 106. Optionally, the connections to the converter 106 are via a filter 107 and the output of the converter may be connected through a chopper 108 and isolators, breakers, or separators 110 to a DC bus 109. As with the other examples, the energy storage module may be a battery or capacitor bank, or other suitable storage device.

The present invention has a number of advantages, including the possibility of reducing the volume, size, cost and complexity of equipment required on the vessel, as well as reducing the size of the equipment needed onshore.

The present invention has been described with respect to an electric or hybrid electric vessel, but is equally applicable to land based electric or hybrid electric vehicles, or electric aircraft, wishing to have certainty about the availability of sufficient high current charging, for example in remote locations where the AC power grid is unable to support rapid DC charging, to enable the vehicle or electric aircraft to complete its journey. Reference to the example of a shore based charging station being the remote supply does not exclude other types of remote charging station, or off-grid supply, such as an offshore wind farm, offshore platform, offshore production facility, or another vessel, vehicle or aircraft adapted to act as the remote supply.

The invention claimed is:

1. An electric charging system for a vessel, vehicle, or aircraft, the system comprising:
    one or more energy storage modules on the vessel, vehicle, or aircraft;
    a pulse rectifier;
    a converter; and
    a voltage control transformer;
    wherein the one or more energy storage modules are connected to outputs of the pulse rectifier;
    wherein the voltage control transformer is connected to inputs of the pulse rectifier;
    wherein the voltage control transformer comprises a serial transformer having a plurality of pairs of transformer windings, connected together in series, one winding of each pair being adapted to be connected between the pulse rectifier and an input from an energy source; and
    wherein the other winding is connected to the converter.

2. The system according to claim 1, wherein the converter comprises a controlled AC to DC converter.

3. The system according to claim 2, wherein the converter further comprises a chopper between the output of the AC to DC converter and a DC bus.

4. The system according to claim 1, wherein the energy storage modules comprise one of a battery or capacitor bank.

5. A vessel, vehicle, or aircraft, comprising:
    a system according to claim 1; and
    at least one consumer on board the vessel, vehicle, or aircraft, connected to the energy storage modules.

6. An electric charging system for a vessel, vehicle, or aircraft, the system comprising:
    one or more energy storage modules on the vessel, vehicle, or aircraft;
    a transformer comprising primary and secondary inductances and a pulse rectifier;

wherein the one or more energy storage modules are connected to the secondary inductances;
a voltage control transformer connected to the primary inductances; and
a converter;
wherein the voltage control transformer comprises a serial transformer having a plurality of pairs of transformer windings, connected together in series, one winding of each pair being adapted to be connected between one of the primary inductances and an input from an energy source; the other winding being connected to the converter.

7. The system according to claim 6,
wherein the input from the energy source comprises phases of a multiphase power supply.

8. The system according to claim 7,
wherein the voltage control transformer comprises the same number of pairs of transformer windings as there are phases of the multiphase power supply.

9. The system according to claim 6,
wherein the input from the energy source comprises connections to a three phase AC supply.

10. The system according to claim 6,
wherein the converter comprises a DC to AC converter.

11. The system according to claim 10,
wherein the converter further comprises an AC to DC converter, or a diode rectifier in series with the DC to AC converter.

12. The system according to claim 11,
wherein the system further comprises taps from the input from the energy source to the AC to DC converter.

13. The system according to claim 12,
wherein a transformer is connected between the AC to DC converter and the taps to the input from the energy source.

14. The system according to claim 6,
wherein the system further comprises a current detector to detect current flowing to or from the energy storage modules on the vessel, vehicle or aircraft.

15. The system according to claim 6,
wherein the system further comprises at least one of current or voltage detectors to provide an indication of current or voltage at the connection to the energy source.

16. The system according to claim 7, further comprising:
a remote charging station;
wherein the multiphase power supply comprises a vessel power supply and the remote charging station comprises a shore based charging station.

17. The system according to claim 6,
wherein one or more energy storage modules are connected to the converter.

18. The system according to claim 16,
wherein the remote charging station further comprises a connector removeably connectable to a vessel, vehicle, or aircraft for electrically connecting energy storage modules of the remote charging station to energy storage modules onboard the vessel, vehicle or aircraft to charge the energy storage modules on the vessel, vehicle, or aircraft.

19. The system according to claim 6,
wherein an onboard grid controller comprising an onboard grid converter and a pre-magnetising transformer on the vessel, vehicle or aircraft provides a voltage source to prevent inrush current on connecting the energy storage modules on the vessel, vehicle, or aircraft to the energy source.

20. A method of charging an electric energy storage system, the method comprising:
initiating a connection to an AC supply to charge an energy storage system of a vessel, vehicle or aircraft by closing a connection from the AC supply and
regulating power from the AC supply to a rectifier transformer by means of a DC to AC converter and a voltage control transformer comprising a plurality of serially connected transformers.

* * * * *